No. 853,031. PATENTED MAY 7. 1907.
A. B. PRENTIS.
DENTAL INSTRUMENT.
APPLICATION FILED OCT. 30, 1906.

2 SHEETS—SHEET 1.

WITNESSES
F. C. Barry
Amos N Hart

INVENTOR
AUGUSTUS B. PRENTIS
BY Munn & Co.
ATTORNEYS

No. 853,031. PATENTED MAY 7, 1907.
A. B. PRENTIS.
DENTAL INSTRUMENT.
APPLICATION FILED OCT. 30, 1906.
2 SHEETS—SHEET 2.
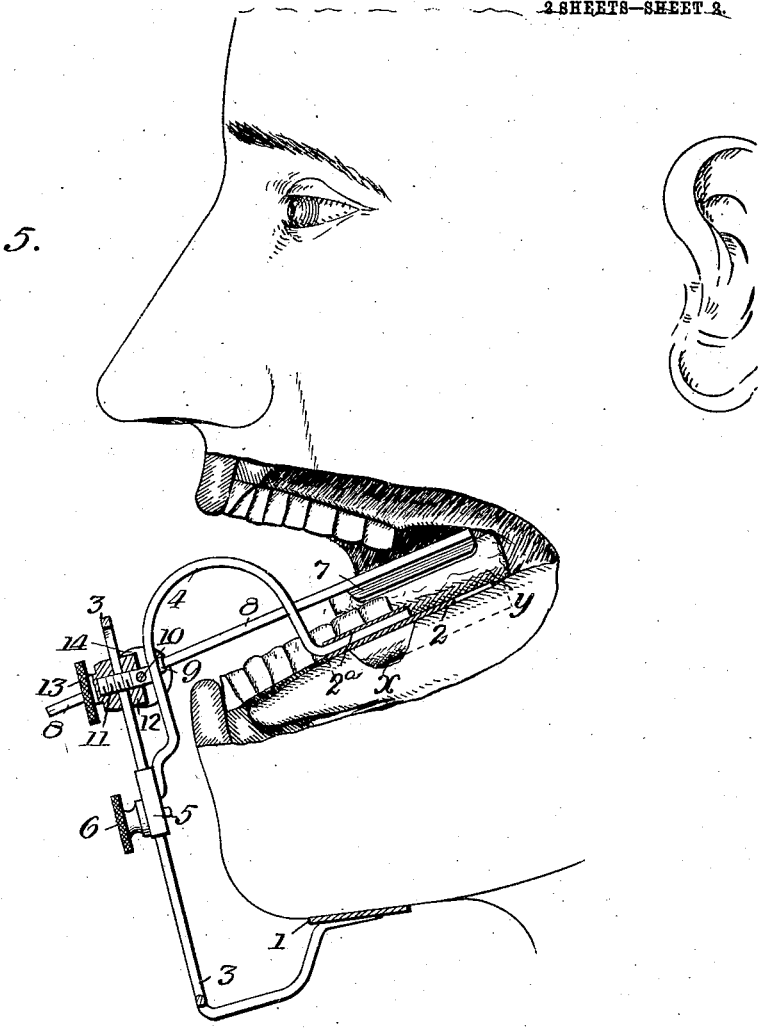
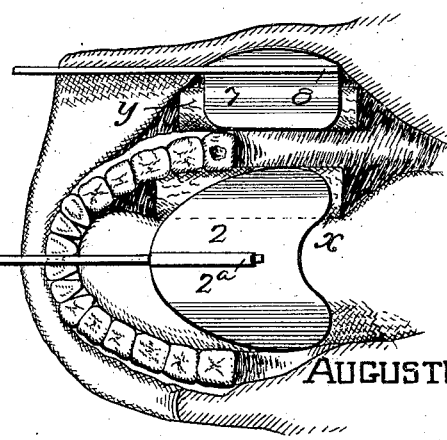
WITNESSES
INVENTOR
AUGUSTUS B. PRENTIS
BY 
ATTORNEYS

UNITED STATES PATENT OFFICE.

AUGUSTUS BRANDEGEE PRENTIS, OF MARSHFIELD, OREGON.

DENTAL INSTRUMENT.

No. 853,031.  Specification of Letters Patent.  Patented May 7, 1907.

Application filed October 30, 1906. Serial No. 341,294.

*To all whom it may concern:*

Be it known that I, AUGUSTUS BRANDEGEE PRENTIS, a citizen of the United States, and a resident of Marshfield, in the county of Coos and State of Oregon, have invented an Improved Dental Instrument, of which the following is a specification.

This invention is an instrument or appliance adapted for holding the tongue and cheek away from the teeth while being filled or crowned and preventing access of saliva to them.

Figure 1:
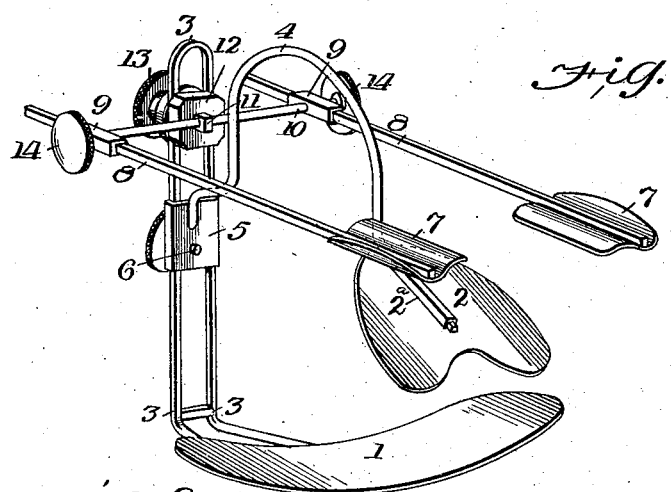
Figure 2:
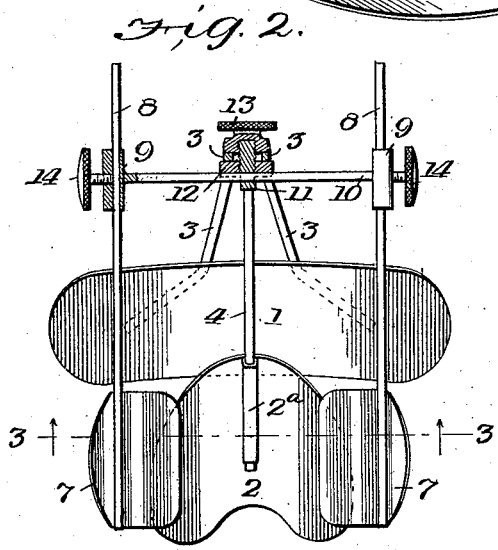
Figure 3:
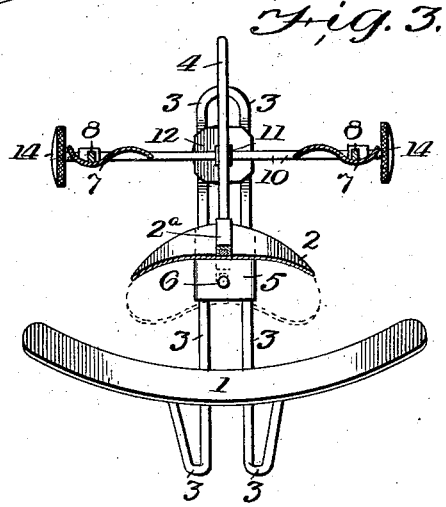
Figure 4:
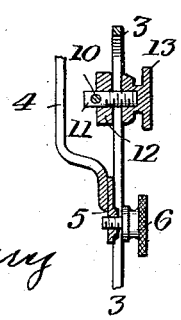

The details of construction, arrangement, combination and operation of the several parts composing the instrument are as hereinafter described and illustrated in the accompanying drawings, in which Figure 1 is a perspective view of the instrument as a whole. Fig. 2 is mainly a plan view, a portion being shown in horizontal section. Fig. 3 is a cross section on the line 3—3 of Fig. 2. Fig. 4 is a detail sectional view illustrating the detachable connections between the bars or frames attached to the chin, tongue, and cheek plates. Figs. 5 and 6 are views roughly illustrating the practical application and use of the instrument.

The parts whereby the instrument as a whole is attached to the lower jaw and held in place, and the tongue at the same time held out of contact with the teeth while they are being filled, or crowned are the chin plate 1 and tongue plate 2, the same being rigidly but adjustably connected by means of bars or arms 3 and 4. The bar or arm 3 is preferably made of two parallel parts which are bent at practically a right angle, and the bar or arm 4 connected with the tongue plate 2 describes a curve, or semicircle, and is rigidly attached to a plate 5 which is adapted to slide on the vertical member of the bars, or arms, 3, and is clamped by a screw 6 in any desired adjustment thereon. As will be understood by reference to Fig. 1, the said plate 5 has side lips or flanges that embrace the outer sides of the bars 3, and, as indicated in Fig. 4, the said plate has a threaded opening to receive the stem of the screw 6, which is provided with an enlarged and milled head and with a boss or base portion which abuts the outer sides of the bars 3. Thus the tongue plate 2 is adapted for vertical adjustment to any required degree and may be clamped firmly in any position in which it may be set on the bar or frame 3. The connection of the curved arm 4 with the tongue plate 2 is a detachable one, the front end of the bar being squared and fitted in the corresponding socket $2^a$ which is secured to the middle of the back of the tongue plate. Thus the latter is prevented from rotating on the bar 4, but may be readily removed therefrom when it is desired to substitute one of different size or form. The bar or arm 4 may be rigid, or it may be a spring bar, so that the plate 2 may yield more or less when pressed upon the tongue. In this connection it will be understood that plates differing in size will be employed corresponding to different sizes of mouths.

The instrument is applied as indicated in Fig. 5, the plate 1 being placed underneath the chin and bearing upward against it, and the plate 2 resting and pressing downward upon the tongue. By this means the instrument as a whole is held in place and the tongue is compressed to any degree required for holding it away from, or out of contact with, a tooth while being filled or crowned. As shown in Fig. 3, the tongue plate 2 is curved downward on each side of the middle corresponding to the transverse curvature of the tongue, but more especially for the purpose of adapting it to hold in place a roll of absorbent cotton $x$—see Figs. 5 and 6—which roll may, when required, be placed between the tongue and the tooth which is to be filled. In this manner, the access of saliva to the tooth from the tongue and the glands beneath it, is effectually prevented.

The means for holding the cheek away from or out of contact with a tooth while being filled, are plates 7 which are rigidly attached to bars 8 that are adapted to slide in sleeves 9 attached to the ends of a transverse rod 10 which passes through the end of a screw 11—see especially Figs. 1 and 2—said screw passing in turn through a washer 12 and connecting with a nut 13, the said washer and nut being arranged on opposite sides of the bars 3 to which the chin plate 1 is attached. It is apparent that, by rotating the nut 13, the screw 11 will be so adjusted as to tighten or loosen the washer 12, and thus to clamp or release the cross bar 10. In brief, by adjustment of the nut 13, which is provided with a milled head for convenience in rotating it, the whole attachment, comprising the cheek plates 7, their supporting bars 8, the sleeves 9, and the connecting cross bar 10, may be adjusted vertically on the bar 3 as conditions may require; and further, that the bar 10 may be clamped against the washer 12 so as to hold it against rotation. To adapt the said bar for rotation, it is made cylindrical, and the hole in the screw 11 through which it passes has a corresponding shape; also, to afford a better friction hold on the rod, the washer 12 has a shallow transverse groove, as indicated by dotted lines Fig. 2. The adaption of the rod 10 to slide through the screw 11, obviously adapts the cheek plates 7 for lateral adjustment, as may be required for mouths of different sizes or for greater or less distention of the cheek. The cheek plates 7 are also adapted for adjustment toward or from the vertical member of the chin-plate bar 3, since they are adapted to slide in the sleeves 9, and may be clamped by screws 14 in any required adjustment. The said bars are also square in cross section, and the sleeves have a corresponding opening, so that the plates 7 are held from rotation on their axes.

To recapitulate, the plates 7 are adapted for adjustment longitudinally, also laterally and vertically, and may be also swung in a vertical plane on the rod 10 as a center. These adjustments obviously adapt the plates to be placed in any position which the exigencies of work may require.

As a rule, but one cheek-distending plate 7 will be employed at one time, although both may be readily employed simultaneously if occasion requires. In Figs. 5 and 6, the plate 7 is shown adjusted in a manner to hold the cheek away from the tooth being filled, and a cotton roll $y$ is shown placed beneath the inner side of the plate adjacent to the gum where a tooth is to be filled, or crowned, so that the access of saliva to the tooth from that side is effectually prevented and the cheek is also held in such position as to afford a comparatively large space for performing the filling or crowning operation.

It will be observed—see Figs. 1 and 3—that the plates 7 are curved longitudinally, the outer side being curved upward for easy contact with the cheek, while the inner side is curved downward to adapt it to hold a cotton roll, as indicated in Figs. 5 and 6.

The instrument may be quickly applied in the position required for use, and causes no discomfort to the patient, and greatly facilitates the filling or crowning operation.

I claim:

1. A dental instrument comprising a chin-plate, a plate for bearing directly upon the tongue, and means for connecting such plates which permit their adjustment vertically, a cheek-distending device which is independent of the tongue plate and adapted for adjustment longitudinally and vertically, as shown and described.

2. The combination, with a chin-bearing plate, a tongue-bearing plate, and a frame by which they are connected, of a cheek-bearing member which is independent of the tongue plate, and means for adjustably connecting it with the body or frame of the instrument, such means comprising a laterally slidable rod with whose outer end the shank of the cheek-bearing member is slidably connected, as shown and described.

3. The combination, with a chin-bearing member, having a right angular arm, and a tongue-bearing member connected therewith, of a cheek-bearing member having an extended shank or bar, a sleeve in which it is slidable, a transversely adjustable bar to which said sleeve is attached, and means for clamping the transverse rod so that it may be held in any required rotary or vertical adjustment, substantially as described.

4. The combination, with a chin-bearing member, a tongue-bearing member, and arms connecting them, of a cheek-bearing member, a transverse rod to which it is attached, and a screw and clamping devices which permit endwise adjustment of the rod and thereby lateral adjustment of the cheek-bearing member and enable the rod to be clamped in any required adjustment, substantially as described.

5. The combination, with a chin-bearing member, and having an arm attached, a second arm which is adjustably connected with the first-named one, and a tongue plate which is detachably applied to the second arm but held from rotation thereon, substantially as described.

6. The combination, with a chin-bearing member, the tongue-bearing member, and means for connecting them, of a cheek-bearing member comprising a plate which is curved upwardly on its outer side and downwardly on its inner side, and means for operatively and adjustably connecting it with the two first-named members, substantially as described.

AUGUSTUS BRANDEGEE PRENTIS.

Witnesses:
MAY R. STAUFF,
JAMES T. HALL.